(12) United States Patent  (10) Patent No.: US 7,648,027 B2
Lin et al.  (45) Date of Patent: Jan. 19, 2010

(54) PROTECTIVE APPARATUS FOR A PORTABLE DEVICE

(75) Inventors: Tay-Yang Lin, Shenzhen (CN); Kuan-Hong Hsieh, Shenzhen (CN)

(73) Assignees: Ensky Technology (Shenzhen) Co., Ltd., Baoan District, Shenzhen, Guangdong Province (CN); Ensky Technology Co., Ltd., Pan Chiao, Taipei Hsien (TW)

( * ) Notice: Subject to any disclaimer, the term of this patent is extended or adjusted under 35 U.S.C. 154(b) by 156 days.

(21) Appl. No.: 11/763,452

(22) Filed: Aug. 29, 2007

(65) Prior Publication Data

US 2007/0293288 A1   Dec. 20, 2007

(30) Foreign Application Priority Data

Jun. 16, 2006   (CN) .................. 2006 1 0061168

(51) Int. Cl.
*B65D 85/00* (2006.01)
(52) U.S. Cl. ...................................... 206/320; 206/702
(58) Field of Classification Search .......... 206/701, 206/702, 722, 320, 576
See application file for complete search history.

(56) References Cited

U.S. PATENT DOCUMENTS

| 3,158,260 | A | * | 11/1964 | Pless | 206/320 |
| 5,029,704 | A | * | 7/1991 | Stillinger | 206/702 |
| 5,848,701 | A | * | 12/1998 | Riccabona | 206/702 |
| 5,887,720 | A | * | 3/1999 | Lin | 206/702 |
| 6,968,955 | B2 | * | 11/2005 | Steeber | 206/702 |
| 2005/0255898 | A1 | | 11/2005 | Huang | |
| 2007/0165371 | A1 | * | 7/2007 | Brandenburg | 361/683 |

FOREIGN PATENT DOCUMENTS

CN   2417653   1/2001

* cited by examiner

*Primary Examiner*—Jacob K Ackun, Jr.
(74) *Attorney, Agent, or Firm*—Winston Hsu

(57) ABSTRACT

The invention provided a protective apparatus for accommodating a portable device and accessories of the portable device. The protective apparatus includes a holder for accommodating the portable device; a retractile member for allowing cable portions of the accessory to be coiled therearound; and a clasp or a receptacle for receiving bulky portions of the accessories. The protective apparatus is simple designed and convenient to wind the cable onto and unwind the cable from the protective apparatus.

16 Claims, 11 Drawing Sheets

PROTECTIVE APPARATUS FOR A PORTABLE DEVICE

BACKGROUND

1. Technical Field

The present invention relates to a protective apparatus that is able to house a portable device and accessories of the portable device.

2. Related Art

As portable electronic devices become smaller and more sophisticated, they are prone to being easily damaged. Some of the portable electronic devices are fitted with accessories for performing extended functions. For example, a cellular phone is usually fitted with an earpiece.

The U.S. Patent Application Publication 20050255898 ('898 publication), entitled "Cell Phone And Holder", published on Nov. 17, 2005, discloses a cell phone holder. The cell phone holder includes a pocket for holding a cell phone, and a housing on the back plate of the cell phone holder for accommodating an earpiece of the cell phone. The housing is a complicated structure for controlling the extension and retraction of the earpiece cable.

The cell phone holder of the '898 publication has, inter alia, the following disadvantages: The earpiece cable of the cell phone is wound around a spool within the complicated housing, which make it inconvenient for a user to install the cable into or remove the earpiece from the housing when the earpiece cable is not necessary for the cell phone. For example, if the original earpiece cable is defective, it is inconvenient for the user to replace a new earpiece into the housing. Additionally, the complicated housing also increases the cost of the cell phone holder.

Accordingly, what is needed is a holder and an accessory housing that provides protection for a portable device and to hold accessories of the portable phone. The holder should be simple in design for easy manipulation and removal of a cable. The simple design also saves on cost.

SUMMARY

A protective apparatus is provided for accommodating a portable device and at least one accessory of the portable device is provided. The protective apparatus includes: a holder configured for accommodating the portable device, the holder comprising a front panel and a back panel; a retractile member fixed on the back of the back panel of the holder for allowing at least part of a cable portion of the at least one accessory to be wound therearound, the retractile member comprising a spool and an operable portion for keeping the coiled cable portion in position around the spool; and a clasp fixed on the back panel of the holder for accommodating the bulky portion of the at least one accessory.

The protective apparatus also can includes: a holder configured for accommodating the portable device, the holder comprising a front panel and a back panel; a retractile member fixed on the back of the back panel of the holder for allowing at least part of a cable portion of the at least one accessory to be wound therearound, the retractile member comprising a spool and an operable portion for keeping the coiled cable portion in position around the spool; and a clasp fixed on the back panel of the holder for accommodating the bulky portion of the at least one accessory.

DETAILED DESCRIPTION OF THE EMBODIMENTS

Figure 1:
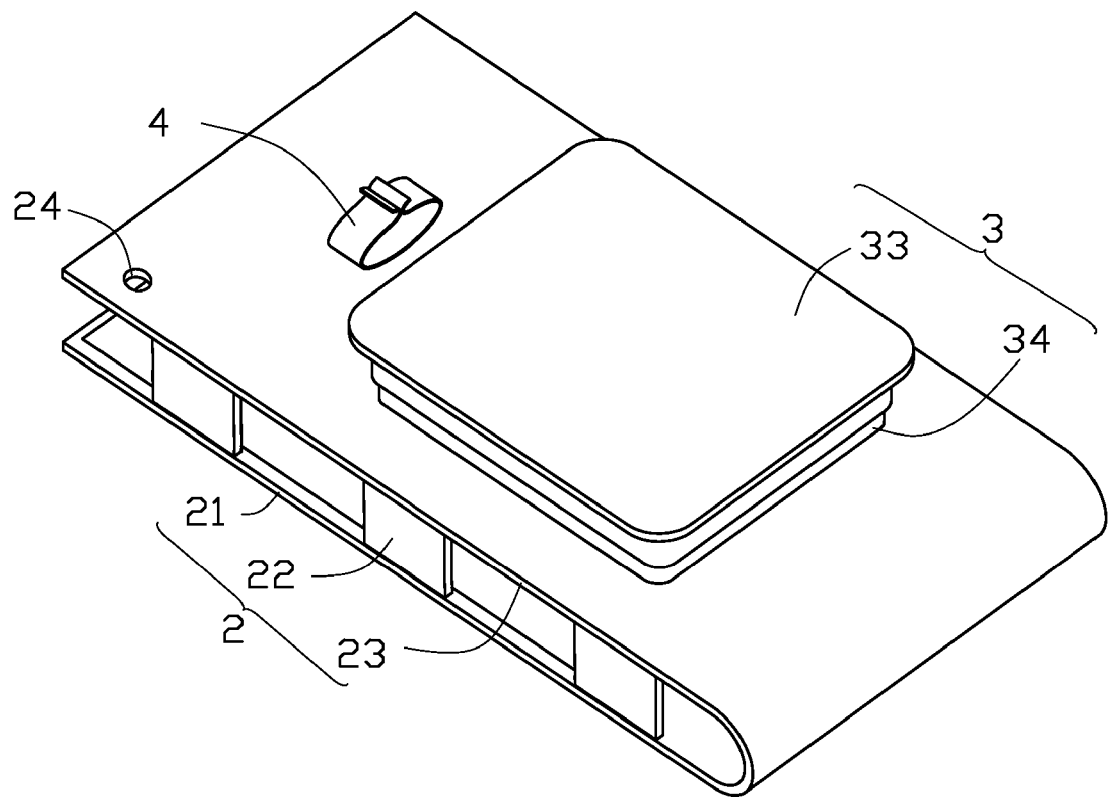
FIG. 1 is an isometric view of a protective apparatus in accordance with a first embodiment of the present invention.

The present invention provides a protective apparatus for protecting a portable device, such as cellular phones, media players, etc. Three embodiments of the present invention are described hereinbelow for the purpose of illustrating features of the protective apparatus. The protective apparatus is used to hold the portable device and accessories of the portable device. The accessory may be divided into a cable portion and a bulky portion.

In the embodiments detailed herein, an earpiece assembly is described as an exemplary accessory. The earpiece assembly includes, for example, an earpiece cable 71 and a pair of earpieces 6 (see for e.g., FIG. 3). The earpiece cable 71 can be considered as a cable portion of the accessory, and the earpieces 6 can be considered as bulky portions of the accessory. In other examples, a cable portion of the accessories can be a microphone cable or a set of data lines. The bulky portion of the accessory can be a mouthpiece of a telephone. Accordingly, the protective apparatus typically includes a retractile member 3 used for holding at least one cable portion, and a receptacle used for holding at least one bulky portion.

Referring to FIGS. 1 to 5, a protective apparatus 10 in accordance with a first embodiment of the present invention are shown. The protective apparatus 10 includes a holder 2 for accommodating the portable device, a retractile member 3 for coiling the earpiece cable 71 therearound, and a clasp 4 for fastening the earpieces 6. That is, the clasp 4 serves as a receptacle for holding bulky portions.

Figure 2:
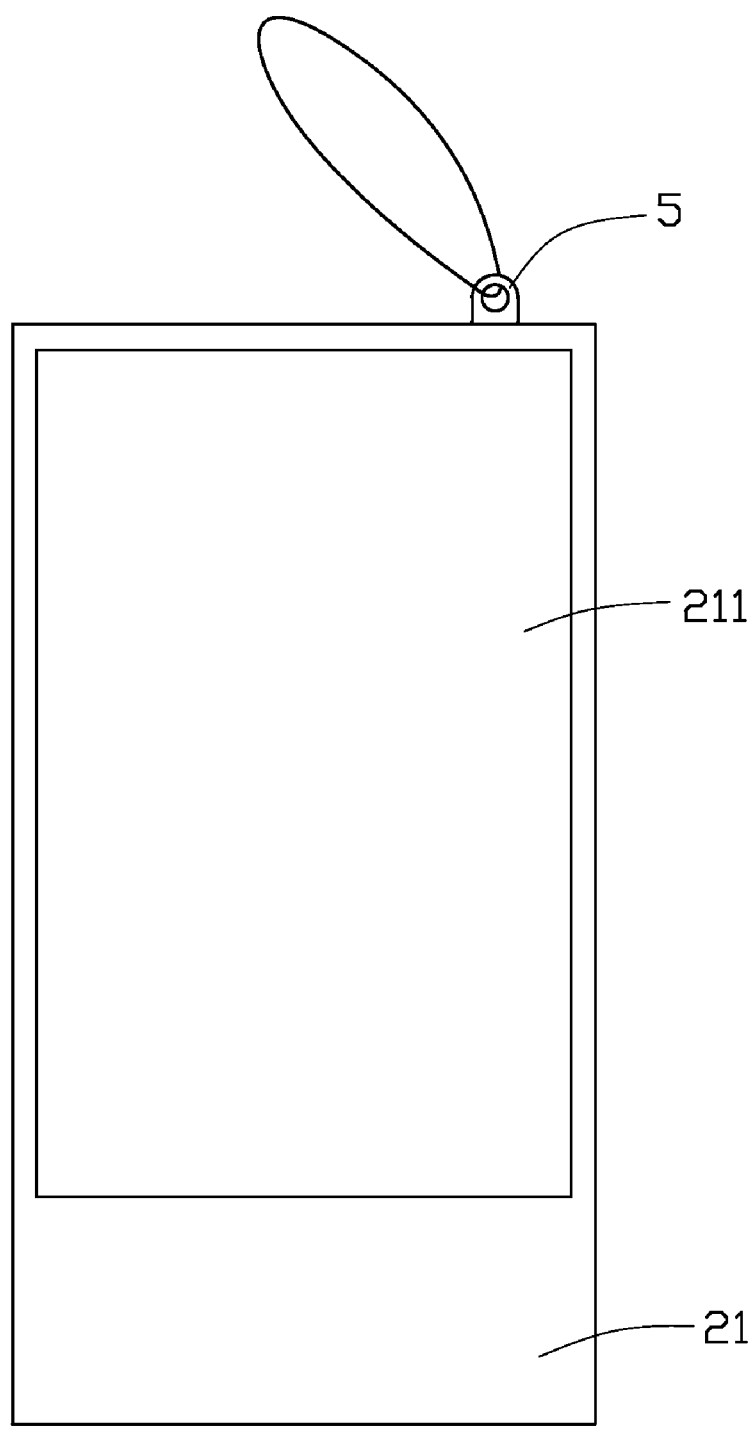
FIG. 2 is a front plan view of the protective apparatus of FIG. 1 together with a detachable handle attached thereto.
Figure 3:
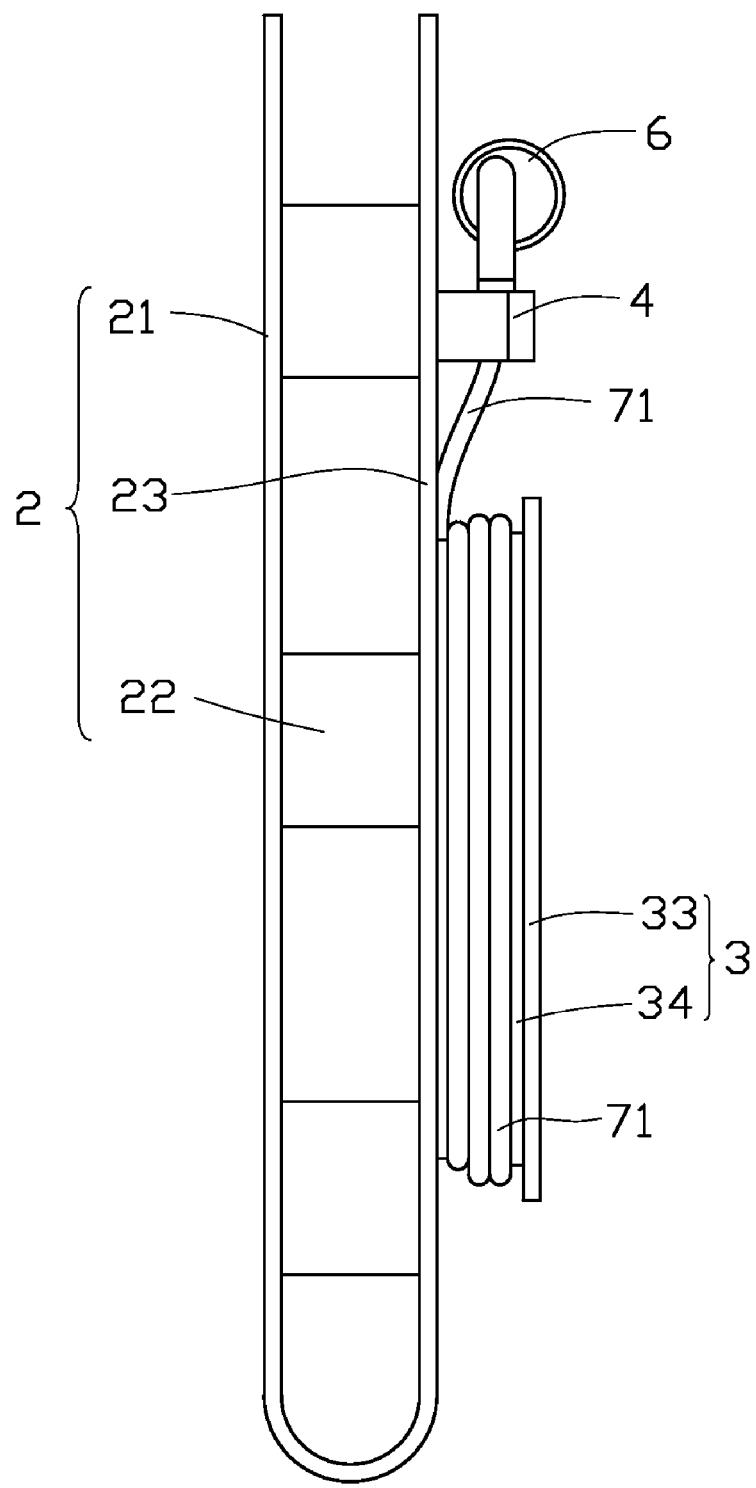
FIG. 3 is a right-side view of the protective apparatus of FIG. 1 together with associated accessories.

Referring particularly to FIGS. 1 to 3, the holder 2 includes a front panel 21, a back panel 23, and a plurality of elastic connecting portions 22 which interconnect the front panel 21 and the back panel 23. In the illustrated embodiment, the expanse of the front panel 21 is made of transparent material 211. Thereby, when the portable device is accommodated in the holder 2, information displayed on a screen of the portable device is viewable through the transparent material 211.

Figure 5:
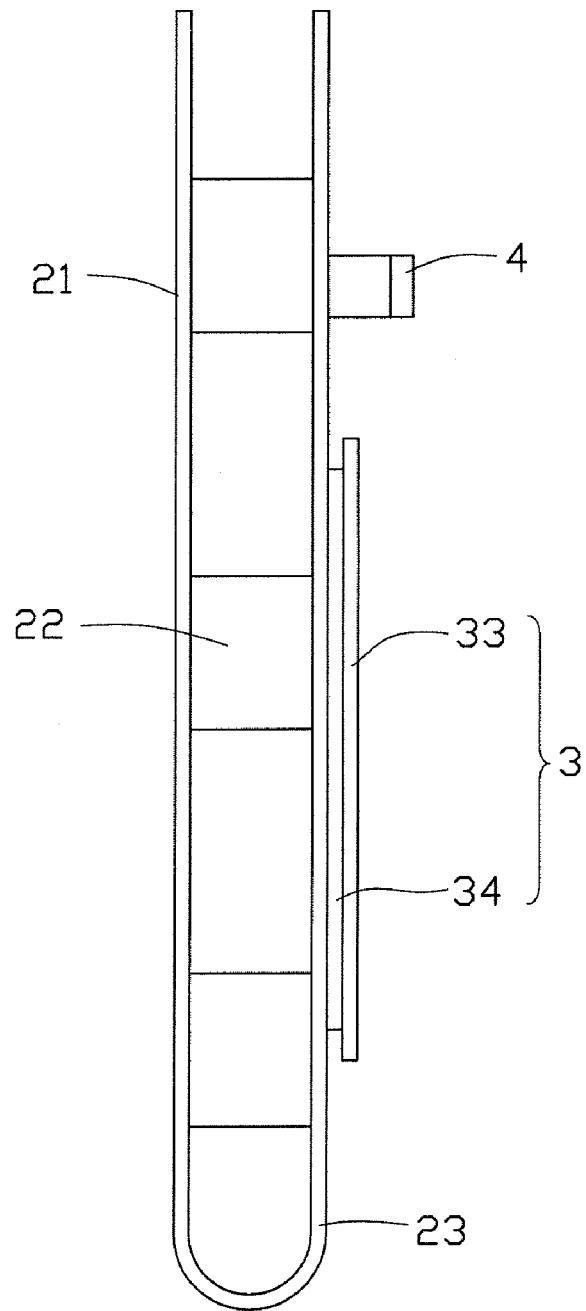
FIG. 5 is similar to FIG. 3, but showing the protective apparatus after the accessories have been removed.

Referring particularly to FIGS. 1, 3 and 5, these show an isometric view and two side views of the protective apparatus 10. The retractile member 3 is fixed to the back panel 23 of the holder 2. The retractile member 3 includes an operation portion 33 and a spool 34. In the illustrated embodiment, the operation portion 33 and the spool 34 are both generally rectangular with rounded corners. The operation portion 33 has a larger area than the spool 34. In alternative embodiments, the operation portion 33 can be circular, oval, or other suitable shapes, as long as an area of the spool 34 is less than that of the operation portion 33. The retractile member is a retractable device that can be locked in a retracted position and locked in an extended position by exerting an external force on the operation portion 33 by a user. For example, the retractile member can include a spring-loaded mechanism as known in the art.

Figure 4A:
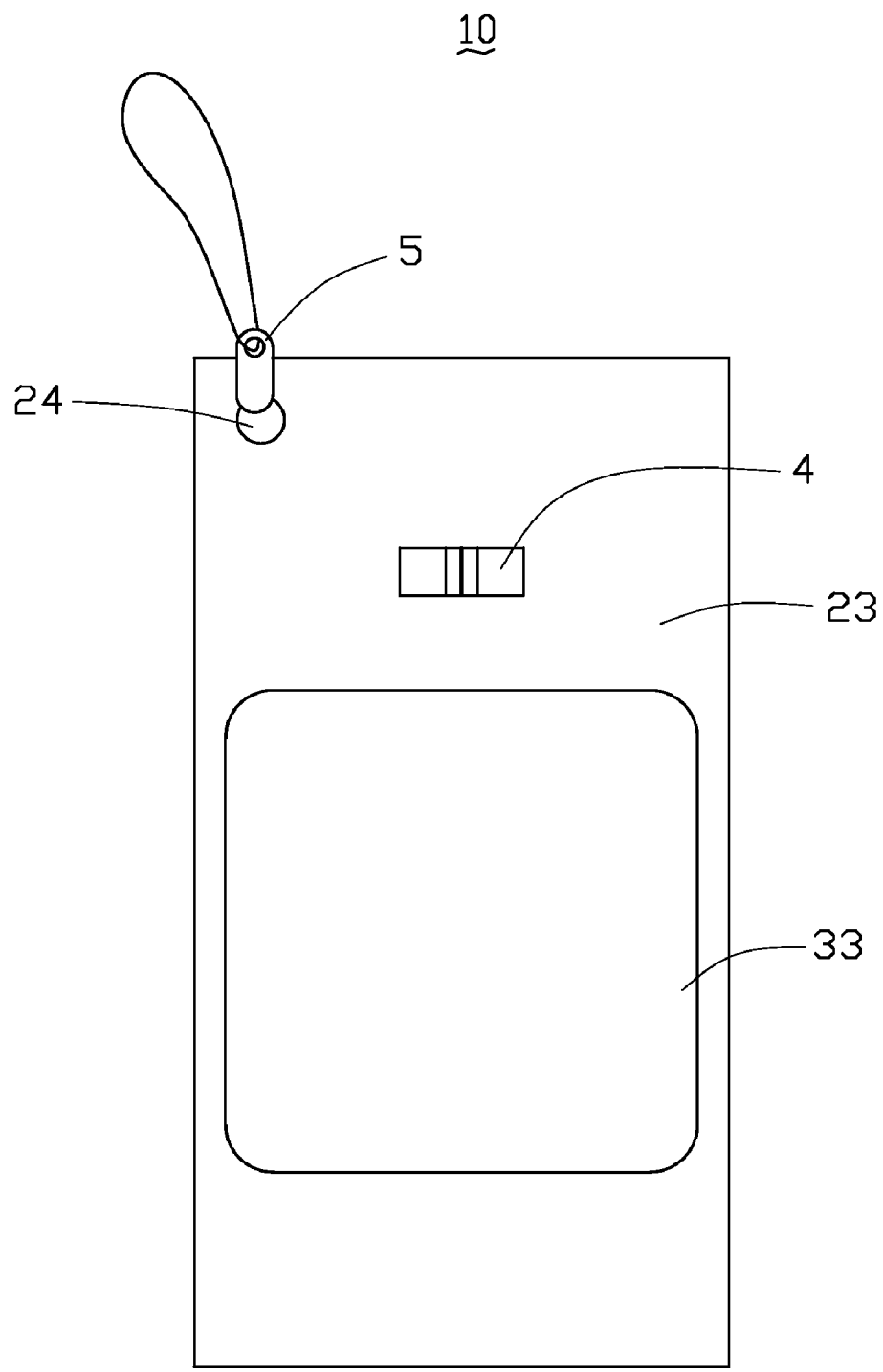
FIG. 4A is a back plan view of the protective apparatus and detachable handle of FIG. 2.
Figure 4B:
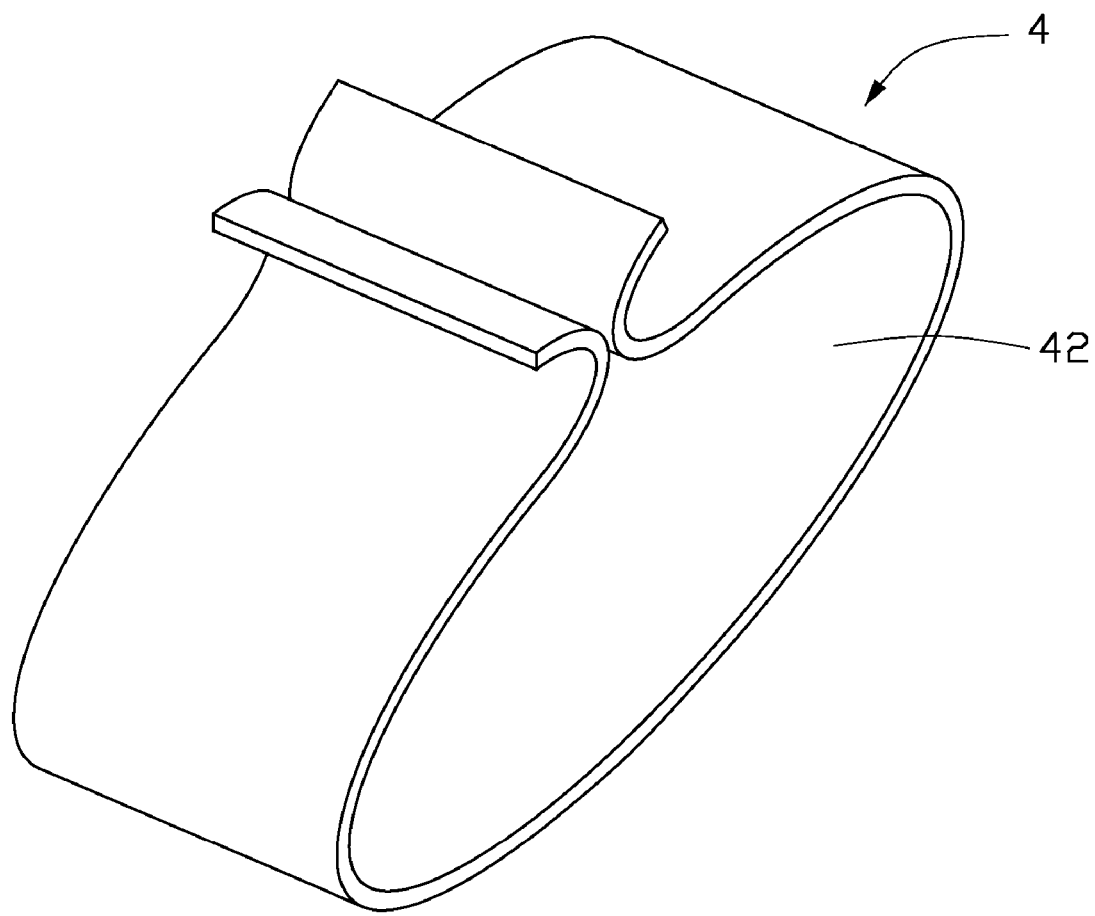
FIG. 4B is an enlarged, isometric view of the clasp of the protective apparatus of FIG. 1.

Referring particularly to FIGS. 1, 4A and 4B, the clasp 4 is fixed on the back panel 23 of the holder 2. In the illustrated embodiment, the clasp 4 is essentially an elastic, elliptical ring with two ends that abut each other. The clasp 4 defines a central through opening 42 for accommodating respective stems (not labeled) of the earpieces 6 therein. The clasp 4 is preferably made of pliable material such as polyethylene, so that the ends of the clasp 4 can be manually separated from each other. Thereby, an entrance is defined between the ends of the clasp 4, the entrance being in communication with the through opening 42. Thus the earpiece cable 71 can first be received in the through opening 42 via the entrance, and then the stems of the earpieces 6 can be resiliently engaged in the through opening 42.

FIG. 3 is a side view of the protective apparatus 10, showing the retractile member in the extended position. In this position, the total span of the retractile member 3 including the spool 34 and the operation portion 33 is larger than the corresponding total span of the clasp 4. The earpiece cable 71 can be conveniently wound around the spool 34. The stems of the earpieces 6 are accommodated into the through opening 42 of the clasp 4.

FIG. 5 shows the protective apparatus 10 after the earpiece cable 71 and the earpieces 6 have been removed, and further shows the retractile member 3 in the retracted position. After the earpiece cable 71 has been from the retractile member 3, there is no need for the retractile member 3 to extent fully. Thus the user can press the retractile member 3 to the retracted position for a volume saving. In this position, the total span of the retractile member 3 including the spool 34 and the operation portion 33 is less than the corresponding total span of the clasp 4. Thus, the protective apparatus 20 occupies a smaller amount of space.

Referring particularly to FIGS. 1 and 2, the back panel 23 of the protective apparatus 10 defines a hole 24. Thereby, a detachable or fixed handle 5 can be attached to the back panel 23. The handle 5 enables the portable device to be conveniently carried when it is retained in the protective apparatus 10. In an alternative embodiment, the hole 24 can instead be defined in the front panel 21.

When the portable device is not to be used, the protective apparatus 10 is used for packing the earpiece cable 71 and the earpiece 6 as follows: A first step is to exert an external force on the operation portion 33 to release the spool 34 into the extended position. A second step is to coil the earpiece cable 71 around the spool 34. A last step is to insert the stems of the earpieces 6 into the through opening 42 of the clasp 4 and thereby resiliently engaging the stems in the clasp 4. Thus, the portable device is accommodated in the protective apparatus 10 and the accessories are neatly placed in the protective apparatus 10.

Figure 6A:
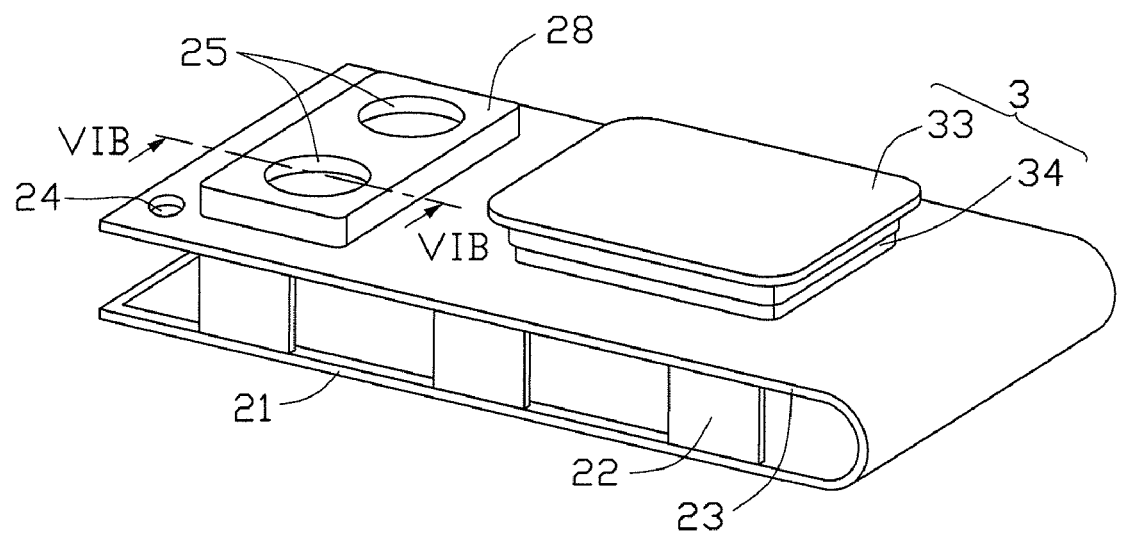
FIG. 6A is an isometric view of a protective apparatus in accordance with a second embodiment of the present invention.

FIG. 6A is an isometric view of a protective apparatus 20 in accordance with a second embodiment of the present invention. The protective apparatus 20 is similar to the above-described protective apparatus 10. However, the protective apparatus 20 includes a pedestal 28 fixed on the back panel 23. The pedestal 28 essentially serves as a receptacle for holding bulky portions. In particular, the pedestal 28 includes a pair of earpiece sockets 25 for receiving the earpieces 6 therein.

Figure 6B:
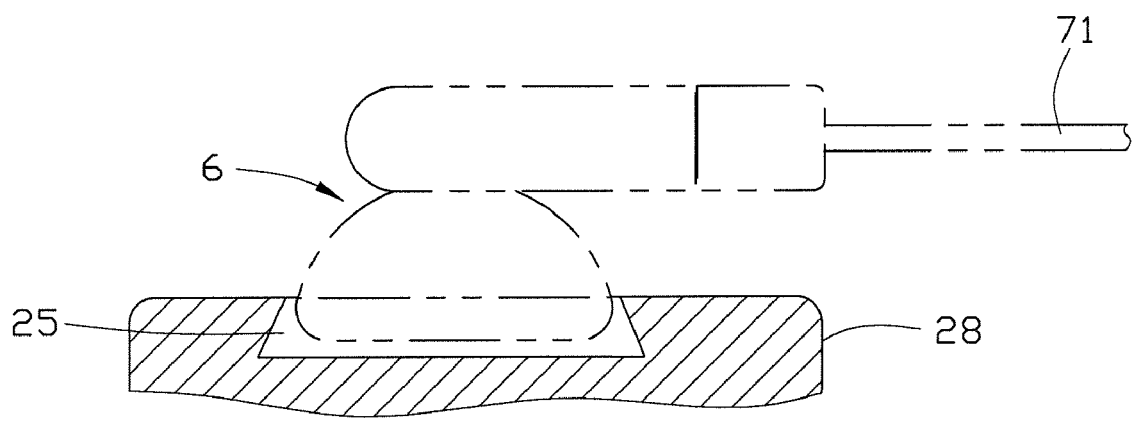
FIG. 6B is an enlarged, cross-sectional view of part of a pedestal of the protective apparatus of FIG. 6A, taken along VIB-VIB thereof, and showing in phantom an earpiece portion of an earpiece engaged in an earpiece socket of the pedestal.

FIG. 6B is an enlarged, cross-sectional view of part of the pedestal 28 showing one of the earpiece sockets 25, also shown is one of the earpieces 6 engaged in the earpiece socket 25. The diameter of an outermost end of the earpiece socket 25 is a little less than a diameter of an innermost end of the earpiece socket 25. The pedestal 28 is typically made of rubber or similar elastic material. When each earpiece 6 is inserted into the corresponding earpiece socket 25, the rim of the earpiece socket 25 elastically deforms to allow the earpiece 6 to enter the earpiece socket 25. After the rim rebounds, the rim blocks the earpiece 6 from falling out of the earpiece socket 25. In alternative embodiments, inner walls of the earpiece sockets 25 can be made of, or include, magnetic material, so as to attract the earpieces 6 and help retain the earpieces 6 in the earpiece sockets 25. In other alternative embodiments, the pedestal 28 can be shaped and sized to accommodate other different kinds of bulky portions of accessories.

Figure 7:
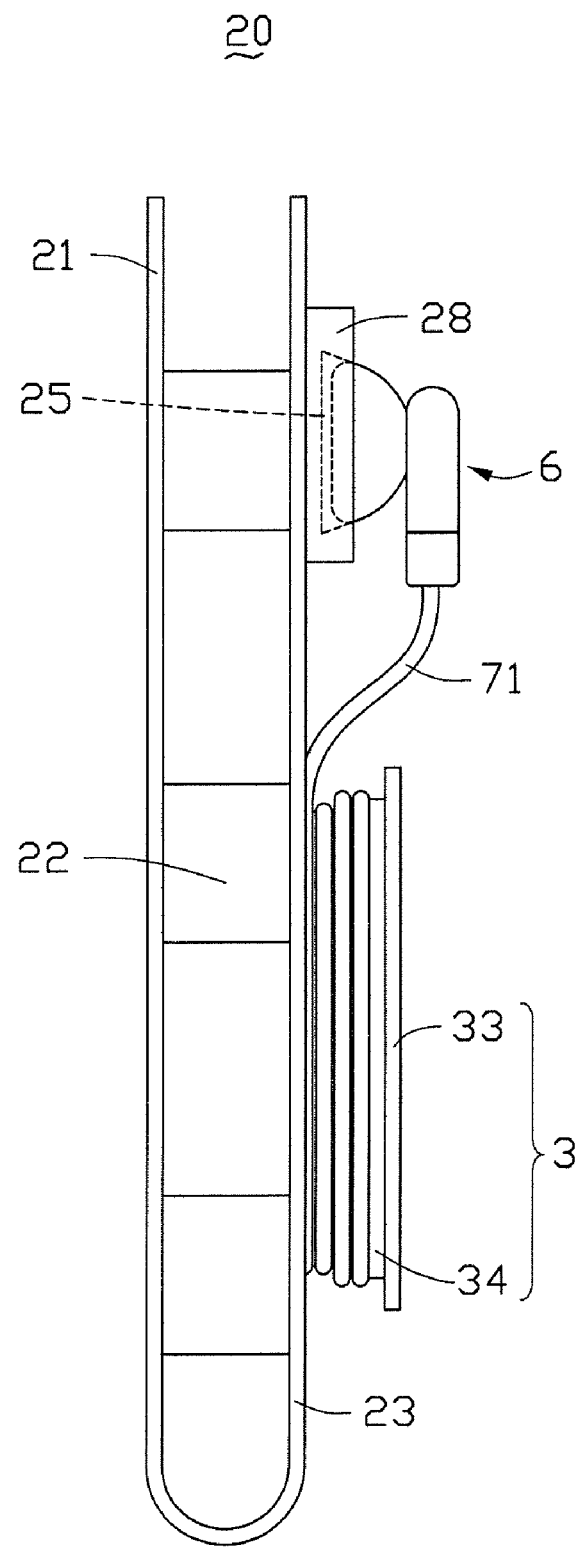
FIG. 7 is a right-side view of the protective apparatus of FIG. 6 together with associated accessories.

FIG. 7 is a right-side view of the protective apparatus 20, showing the spool 34 in the extended position. In this position, a user can conveniently coil the earpiece cable 71 around the spool 34. The earpieces 6 are inserted into the earpiece sockets 25 of the pedestal 28.

Figure 8:
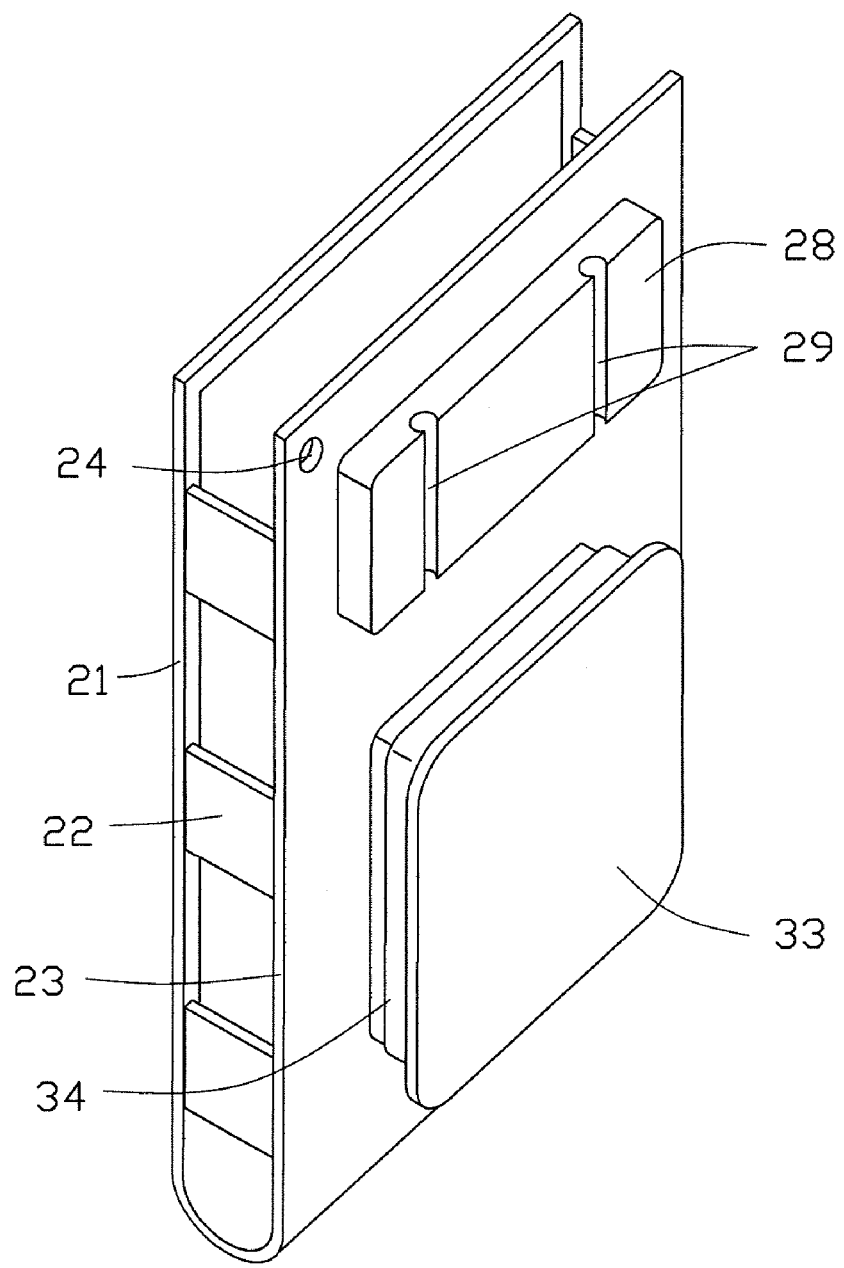
FIG. 8 is an isometric view of a protective apparatus in accordance with a third embodiment of the present invention, a pair of grooves are concaved in the pedestal.
Figure 9:
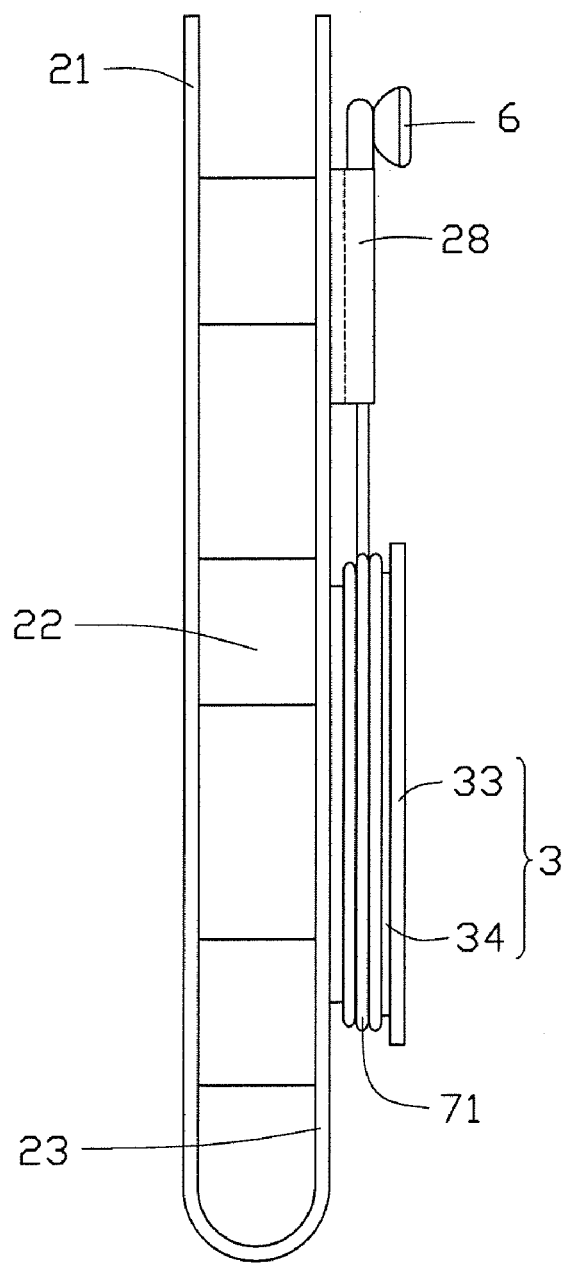
FIG. 9 is a right-side view of the protective apparatus of FIG. 6 together with associated accessories.

FIG. 8 is an isometric view of a protective apparatus 30 in accordance with a third embodiment of the present invention. The protective apparatus 30 is similar to the above-described protective apparatus 20. However, the pedestal 28 defines a pair of grooves 29 at a main outer surface thereof, for retaining the stems of the earpieces 6 therein. A transverse width of an opening of each of the grooves 29 at the outermost surface of the pedestal 29 is narrower than a corresponding width of a midsection of the groove 29 inside the pedestal 29. Due to the resilient properties of the pedestal 29, when the stems of the earpieces 6 are inserted into the grooves 29, the wider midsections of the grooves 29 are able to accommodate the full widths of the stems of the earpieces 6, while rim portions of the pedestal 28 at the narrower openings of the grooves 29 prevent the stems of the earpieces 6 from falling out from the grooves 2.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A protective apparatus for retaining a portable device and at least one accessory of the portable device, the protective apparatus comprising:

a holder configured for accommodating the portable device, the holder comprising a front panel and a back panel;

a retractile member fixed to the back panel of the holder for allowing at least part of a cable portion of the at least one accessory to be wound therearound, the retractile member comprising a spool and an operable portion for keeping the coiled cable portion in position around the spool, wherein the retractile member is configured to be locked in a retracted position adjacent to the back panel by exerting a first external force on the operable portion, and configured to be locked in an extended position spaced apart from the back panel by exerting a second external force, opposite in direction to the first external force, on the retractile member; and a clasp fixed on the back panel of the holder for accommodating a bulky portion of the at least one accessory.

2. The protective apparatus according to claim 1, wherein the holder further comprises at least one elastic connecting portion interconnecting the front panel and the back panel.

3. The protective apparatus according to claim 1, wherein the holder has a hole defined therein, for attaching a detachable handle to the holder.

4. The protective apparatus according to claim 3, wherein at least a part of the front panel is made of transparent material.

5. The protective apparatus according to claim 4, wherein an area of the spool is less than that of the operation portion.

6. The protective apparatus according to claim 1, wherein the clasp is of an elastic material and elliptical in shape having two ends that abut each other.

7. The protective apparatus according to claim 6, wherein the clasp defines a central through opening, and when the ends of the clasp are separated from each other, the ends define an entrance therebetween, the entrance being in communication with the through opening.

8. A protective apparatus for retaining a portable device and at least one accessory of the portable device, the protective apparatus comprising:

a holder configured for accommodating the portable device, the holder comprising at least one elastic connecting portion interconnecting a front panel and a back panel;

a retractile member is fixed on the back of the back panel of the holder for allowing at least part of a cable portion of the at least one accessory to be coiled therearound, the retractile member comprising a spool and an operable portion for keeping the coiled cable portion in position around the spool, wherein the retractile member is configured to be locked in a retracted position adjacent to the back panel by exerting a first external force on the operable portion, and configured to be locked in an extended position spaced apart from the back panel by exerting a second external force, opposite in direction to the first external force, on the retractile member; and a pedestal fixed on the back panel of the holder for configuring a receptacle to receive at least part of a bulky portion of the at least one accessory.

9. The protective apparatus according to claim 8, wherein at least a part of the front panel is made of transparent material.

10. The protective apparatus according to claim 9, wherein an area of the spool is less than that of the operation portion.

11. The protective apparatus according to claim 8, wherein the receptacle comprises a pair of earpiece sockets in the pedestal.

12. The protective apparatus according to claim 11, wherein a diameter of an outermost end of each of the earpiece sockets is less than a diameter of an innermost end of the earpiece socket.

13. The protective apparatus according to claim 12, wherein an inner wall of each of the earpiece sockets comprises magnetic material.

14. The protective apparatus according to claim 8, wherein the receptacle comprises a pair of grooves defined at a main outer surface of the pedestal.

15. The protective apparatus according to claim 14, wherein a transverse width of an opening of each of the grooves at the outermost main surface of the pedestal is narrower than a corresponding width of a midsection of the groove inside the pedestal.

16. The protective apparatus according to claim 8, wherein the holder has a hole defined therein, for attaching of a detachable handle to the holder.

* * * * *